(12) United States Patent
Lee et al.

(10) Patent No.: US 8,502,134 B2
(45) Date of Patent: Aug. 6, 2013

(54) RADIATION MEASUREMENT INSTRUMENT CALIBRATION FACILITY CAPABLE OF LOWERING SCATTERED RADIATION AND SHIELDING BACKGROUND RADIATION

(75) Inventors: Jeng-Hung Lee, Taoyuan County (TW); Shi-Hwa Su, Taoyuan County (TW); Bor-Jing Chang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 126 days.

(21) Appl. No.: 13/278,666

(22) Filed: Oct. 21, 2011

(65) Prior Publication Data
US 2013/0099138 A1    Apr. 25, 2013

(51) Int. Cl.
*G01D 18/00* (2006.01)
*G21F 5/00* (2006.01)

(52) U.S. Cl.
USPC ............ 250/252.1; 250/496.1; 250/515.1

(58) Field of Classification Search
USPC .......... 250/252.1, 496.1–498.1, 505.1–507.1, 250/515.1; 378/207
See application file for complete search history.

(56) References Cited

U.S. PATENT DOCUMENTS

| 3,107,299 | A | * | 10/1963 | Jachter | 250/252.1 |
| 5,032,719 | A | * | 7/1991 | Gleason et al. | 250/252.1 |
| 5,615,244 | A | * | 3/1997 | Dykster et al. | 378/57 |
| 2009/0285366 | A1 | * | 11/2009 | Essenreiter et al. | 378/207 |
| 2010/0054396 | A1 | * | 3/2010 | Warner et al. | 378/19 |

* cited by examiner

*Primary Examiner* — Robert Kim
*Assistant Examiner* — David E Smith
(74) *Attorney, Agent, or Firm* — WPAT, PC; Justin King

(57) ABSTRACT

The present invention relates to a radiation measurement instrument calibration facility with the abilities of lowering scattered radiation and shielding background radiation and it is capable of providing a suitable environment for performing performance test, calibration and experiment upon a radiation measurement instrument. In an embodiment, the calibration facility comprises: a shielding device, a collimator, a multi-source irradiator, a radiation baffle, a carrier, an electric door unit and a control unit. With the design of the calibration facility of the present invention, the interference coming from the background radiation and scattered radiation in the laboratory during the radiation measurement instrument calibration can be effectively reduced to enhance the accuracy of measurement or calibration for the instrument, and also the instrument calibration and testing can be performed in radiation fields of low-, medium- and high-dose rate levels to meet the requirements of ISO 4037-1 (1996) Standard.

9 Claims, 5 Drawing Sheets

RADIATION MEASUREMENT INSTRUMENT CALIBRATION FACILITY CAPABLE OF LOWERING SCATTERED RADIATION AND SHIELDING BACKGROUND RADIATION

FIELD OF THE INVENTION

The present invention relates to a radiation measurement instrument calibration facility capable of lowering scattered radiation and shielding background radiation, and more particularly, to a calibration facility capable of providing a suitable environment for performing performance test, calibration and experiment upon a radiation measurement instrument. In an embodiment, the calibration facility comprises: a shielding device, a collimator, a multi-source irradiator, a radiation baffle, a carrier, an electric door unit and a control unit, using that not only the affection of background radiation existing in the ambient environment of the facility can be reduced, but also the affection of scattered radiation resulting from the emission of the multi-source irradiator can be lowered by the use of the collimator as it is used for enabling the radiation field size of the radiation beam to be smaller than the apertures on the travelling path of the same, and thus the accuracy of the instrument performance test, calibration and experiment is prevented from being adversely affected by the scattered radiation. Moreover, as there are illuminators, video monitors and environment sensors, such as thermometers, hygrometers, and pressure meters, being mounted inside the shielding device, the measurement of an instrument being calibrated by the use of the calibration facility can be monitored and displayed in a real time manner.

BACKGROUND OF THE INVENTION

Generally, the operation of a conventional apparatus for calibrating radiation measurement instruments comprises the following steps: a radiation measurement instrument that is to be calibrated in a radiation field produced from a standard radiation source; recording and analyzing the readout values of the to-be-calibrated instrument so as to obtain a calibration factor or test parameter for the to-be-calibrated instrument. However, it is noted that using the aforesaid conventional calibration apparatus, the interference of the background radiation and scatter radiation toward the readout values of the to-be-calibrated instrument is generally unpreventable, and consequently, not only the radiation measurement accuracy of the radiation measurement instrument that is calibrated using the conventional calibration apparatus without necessary correction is questionable, but also the safety of radiation professionals may be endangered by the incorrect radiation readout. Thus, it is in need of an improved radiation measurement instrument calibration facility that is capable of effectively reducing the interference of the background radiation and scatter radiation toward the instrument and thus uplifting the measurement accuracy. In addition, the establishment of such a facility can also to be used for providing a suitable environment for performing performance test, calibration and experiment upon the radiation measurement instruments.

Please refer to FIG. 1, which is a schematic diagram showing a conventional apparatus for calibrating radiation measurement instruments. As shown in FIG. 1, the conventional calibration apparatus is installed inside a laboratory 1, while allowing a to-be-calibrated instrument 11 to be disposed on a cart 12 that is mounted on a rail 13 so as to be moved along therewith, and thus enabling the to-be-calibrated instrument 11 to move to a specific location for allowing the same to be irradiated by a primary radiation beam emitted from a radiation source 141 of irradiator 14. It is noted that, operationally, the readout values of the to-be-calibrated instrument 11 are interfered by the background radiation 15 and scatter radiation 16 of the primary radiation beam inside the laboratory 1. In the regulation specified in ISO 4037-1 Standard (1996), the amount of scatter radiation 16 should not exceed 5% of the primary radiation beam. However, the conventional calibration apparatuses are not able to ensure to lower their scatter radiation to meet the ISO 4037-1 (1996) requirement due to the space limitation and structural design of the laboratory where they are installed. In addition, although the background radiation 15 of most conventional calibration apparatuses can be neglected while operating in medium and high dose rate radiation field, but while operating in low dose rate radiation field, the measurement accuracy can be severely affected by the background radiation 15 since its amount can achieve more than 20% of the primary radiation beam. Thus, the improved radiation measurement instrument calibration facility of the present invention is designed to overcome the aforesaid shortcomings in view of enhancing the accuracy of measurement or calibration for the instrument.

SUMMARY OF THE INVENTION

In view of the disadvantages of prior art, the primary object of the present invention is to provide a radiation measurement instrument calibration facility with the abilities of lowering scattered radiation and shielding background radiation, that is capable of providing a suitable environment for performing performance test, calibration and experiment upon a radiation measurement instrument. In an embodiment, the calibration facility comprises: a shielding device, a collimator, a multi-source irradiator, a radiation baffle, a carrier, an electric door unit and a control unit, using that not only the affection of background radiation existing in the ambient environment of the facility can be reduced, but also the affection of scattered radiation resulting from the emission of the multi-source irradiator can be lowered by the use of the collimator as it is used for enabling the radiation field size of the radiation beam to be smaller than the apertures on the travelling path of the same, and thus the accuracy of the instrument performance test, calibration and experiment is prevented from being adversely affected by the scattered radiation. Moreover, as there are illuminators, video monitors and environment sensors, such as thermometers hygrometers, and pressure meters, being mounted inside the shielding device, the measurement of an instrument being calibrated by the use of the calibration facility can be monitored and displayed in a real time manner.

To achieve the object, the present invention provides a radiation measurement instrument calibration facility capable of lowering scattered radiation and background radiation, which is adapted to be disposed inside a laboratory, and comprises:

a shielding device, for shielding the scattered radiation and background radiation inside the laboratory, being configured with an inlet, an outlet and a cavity in a manner that the inlet, the outlet and the cavity are arranged in communication with each other while the to-be-calibrated instrument being placed in the cavity and the cavity being in communication with two openings formed respectively on two sides of the shielding device that are perpendicular to the inlet and the outlet;

an electric door unit, for positioning the to-be-calibrated instrument in the shielding device as well as controlling the movement of two door panels for enabling the two to wall the two openings of the shielding device;

a control unit, for controlling the operation of the electric door unit;

a multi-source irradiator, configured with several radiation sources of different intensity, capable of emitting a primary radiation beam while allowing the radiation intensity of the same to be variable according to the radiation source that is selected from the irradiator for the emission;

a collimator, for controlling the radiation field size of the primary radiation beam while enabling the primary radiation beam to travel into the shielding device through the inlet and out of the same through the outlet;

a carrier, for carrying the shielding device and the electric door unit while adjusting the levels of the two; and a radiation baffle, for reducing the amount of background radiation entering the shielding device through the outlet.

Moreover, the present invention further provide an operation method for the aforesaid radiation measurement instrument calibration facility capable of lowering scattered radiation and background radiation, which comprises the steps of:

(A1) adjusting the carrier for leveling the shielding device and the electric door;

(A2) enabling the collimator to operate for controlling the radiation field size of the primary radiation beam to an extent that it is smaller than the inlet and the outlet so as to reduce the amount of scatter radiation generated from the interaction between the primary radiation beam and the inside of shielding device;

(A3) arranging the radiation baffle to be disposed at a position outside the outlet for reducing the amount of background radiation entering the shielding device through the outlet;

(A4) using a fixing rack of the electric door unit to position the to-be-calibrated instrument while using the control unit to remotely control a step motor of the electric door unit for enabling the two door panels to move along a rail until walling the shielding device;

(A5) selecting a radiation source from the multi-source irradiator to be used for producing a suitable radiation field upon the to-be-calibrated instrument for performing performance test, calibration and experiment upon the same, while using illuminators, video monitors, thermometers, hygrometers, and pressure meters that are being mounted inside the shielding device, to collect, record and analyze environmental monitoring data as well as data relating to the readouts of the to-be-calibrated instrument; and (A6) opening the two door panels for retrieving the to-be-calibrated instrument out of the calibration facility.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
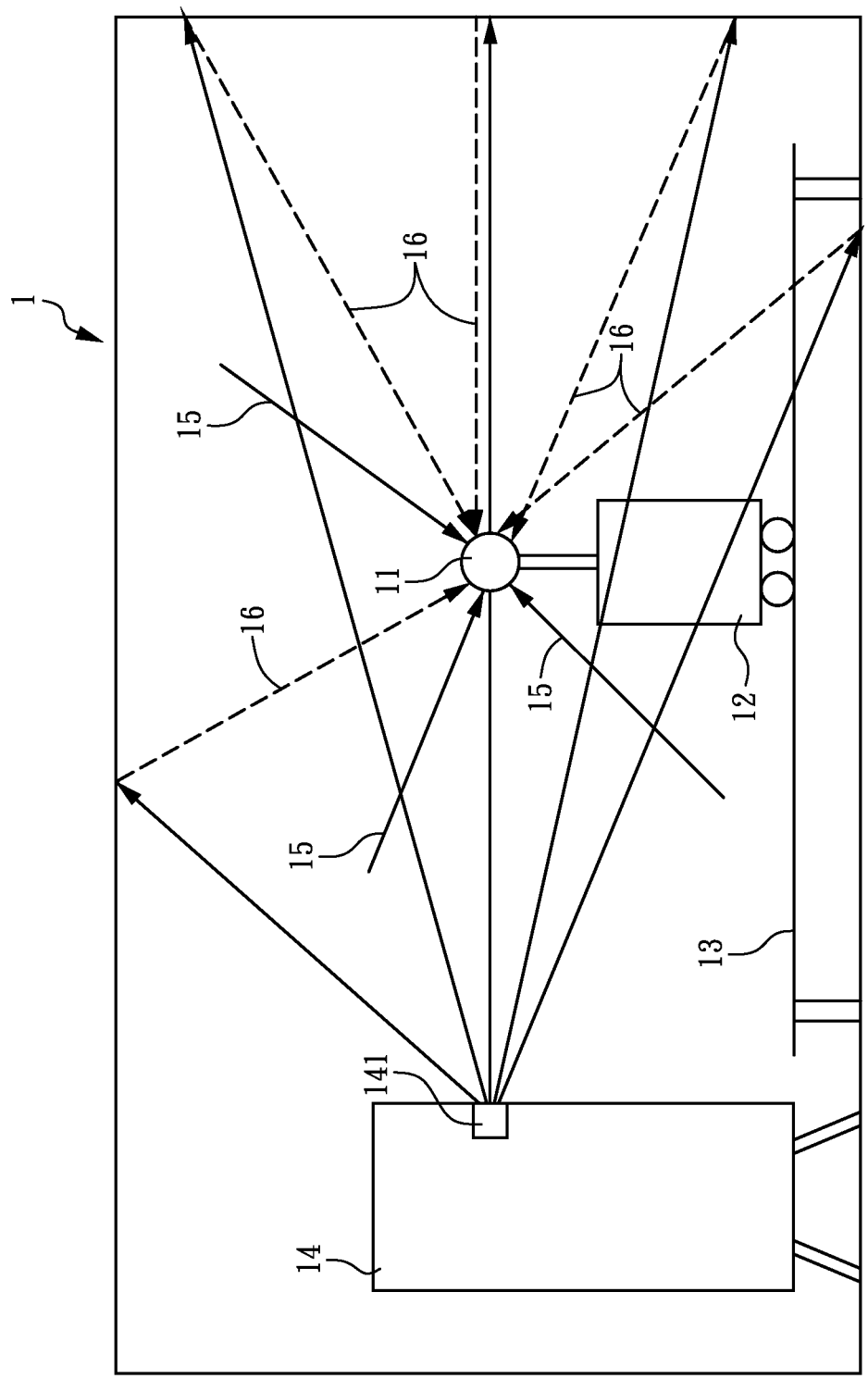
FIG. 1 is a schematic diagram showing a conventional apparatus for calibrating radiation measurement instruments.
Figure 2:
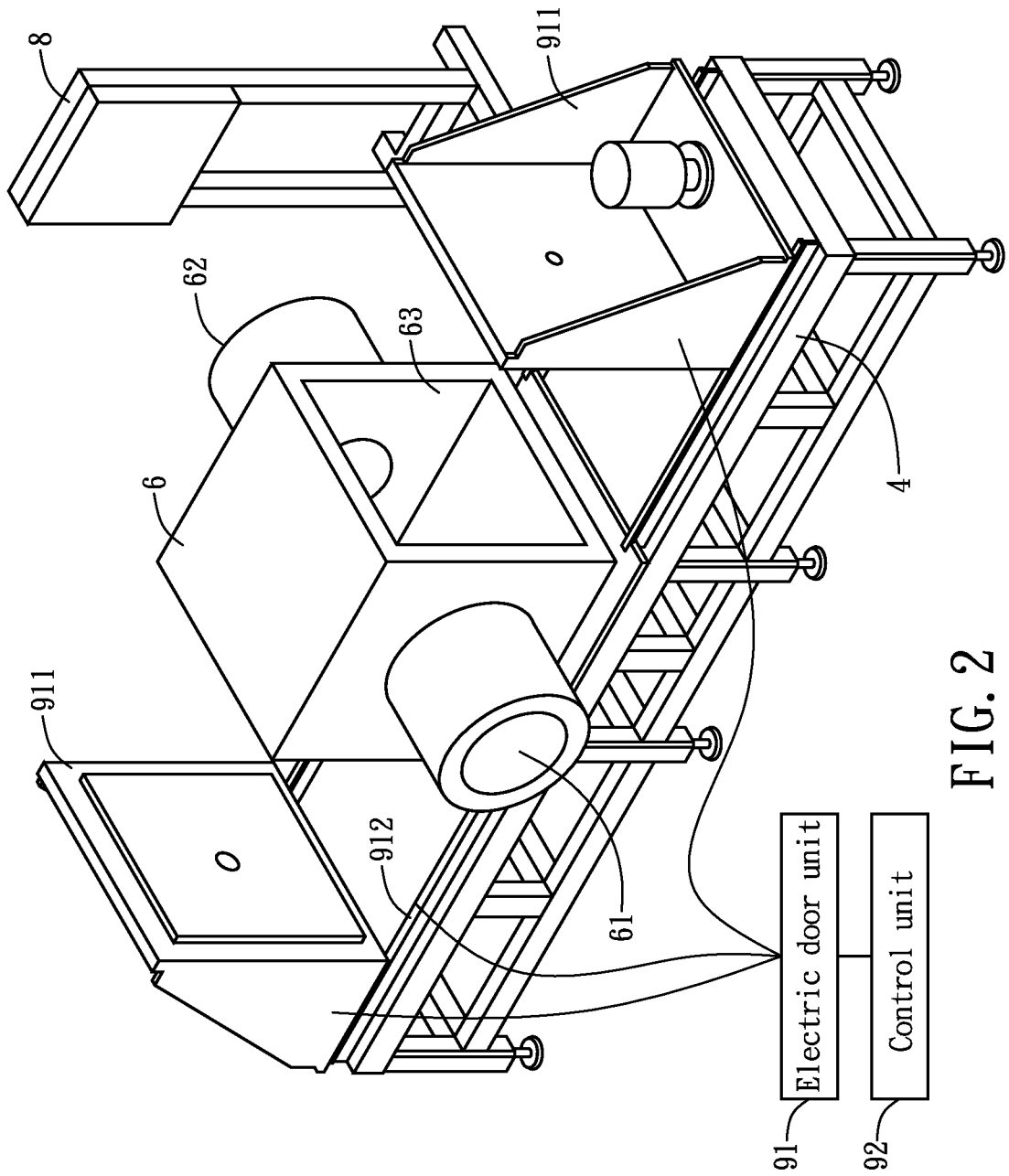
FIG. 2 is a three-dimensional view of a radiation measurement instrument calibration facility capable of lowering scattered radiation and shielding background radiation according to an embodiment of the invention.
Figure 3:
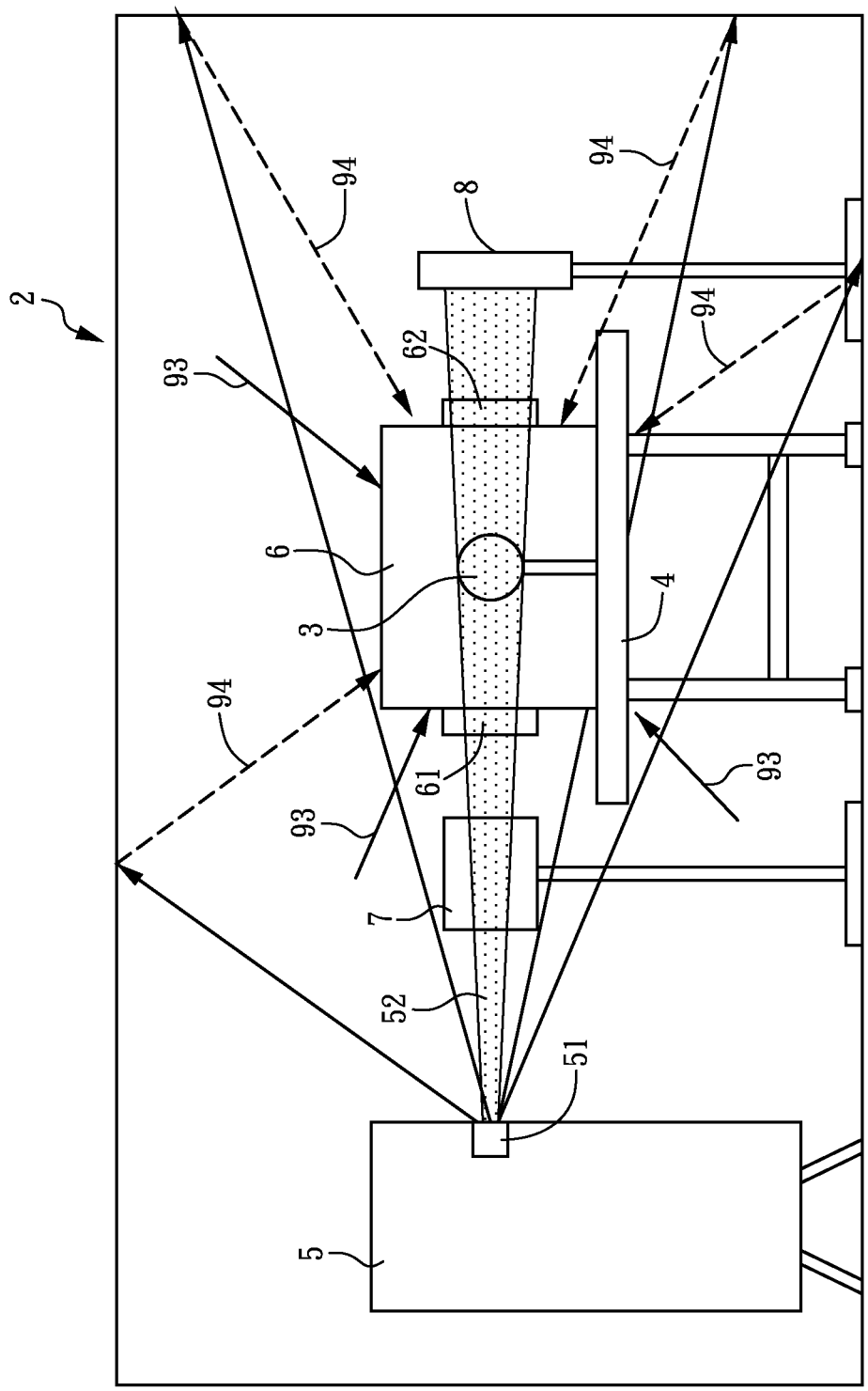
FIG. 3 is a cross sectional view of a radiation measurement instrument calibration facility capable of lowering scattered radiation and shielding background radiation according to an embodiment of the invention.

1. Please refer to FIG. 2 and FIG. 3, which show a radiation measurement instrument calibration facility capable of lowering scattered radiation and shielding background radiation according to an embodiment of the invention. In the embodiment shown in FIG. 2 and FIG. 3, the radiation measurement instrument calibration facility, that is installed inside a laboratory 2, comprises: a shielding device 6, for shielding the scattered radiation 94 and background radiation 93 inside the laboratory 2, being configured with an inlet 61, an outlet 62 and a cavity 63 in a manner that the inlet 61, the outlet 62 and the cavity 63 are arranged in communication with each other while the to-be-calibrated instrument 3 being placed in the cavity 63 and the cavity 63 being in communication with two openings formed respectively on two sides of the shielding device 6 that are perpendicular to the inlet 61 and the outlet 62; an electric door unit 91, for positioning the shielding device 6 and the to-be-calibrated instrument 3 as well as controlling the movement of two door panels 911 for enabling the two to wall the two openings of the shielding device 6. The electric door unit 91 further comprises: a rail 912, for guiding the two door panels 911 to move along therewith; and a step motor, for power and driving the two door panels 911 to move; a control unit 92, for controlling the operation of the electric door unit 91 in a remote manner; a multi-source irradiator 5, configured with several radiation sources 51 of different intensity, capable of emitting a primary radiation beam 52 while allowing the radiation intensity of the same to be variable according to the radiation source 51 that is selected from the irradiator for the emission; a collimator 7, for controlling the radiation field of the primary radiation beam 52 while enabling the primary radiation beam 52 to travel into the shielding device 6 through the inlet 61 and out of the same through the outlet 62; a carrier 4, for carrying the shielding device 6 and the electric door unit 91 while adjusting the levels of the two; and a radiation baffle 8, for reducing the amount of background radiation entering the shielding device 6 through the outlet 62; wherein, the to-be-calibrated instrument 3 is received inside the cavity 63 of the shielding device 6, while allowing the to-be-calibrated instrument 3 to be fixed securely by the use of the fixing rack that are mounted on the external of the to-be-calibrated instrument 3; and the cavity 63 of the shield device 6 further has an illuminator, a video monitor, and environment sensors, such as thermometer, hygrometer, and pressure meter that are mounted inside the cavity 63 of the shielding device 6.

Figure 4A:
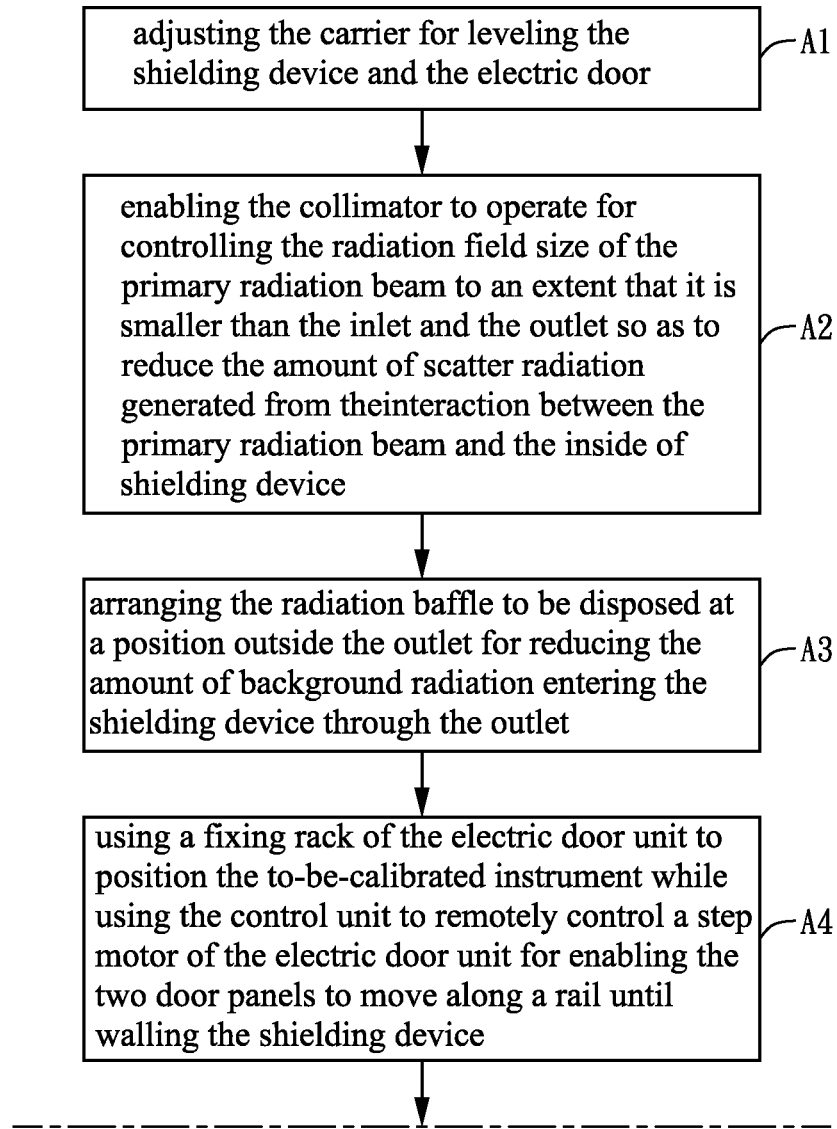
FIG. 4 (FIG. 4A and FIG. 4B) is a flow chart depicting steps of a method for calibrating radiation measurement instruments according to the present invention.
Figure 4B:
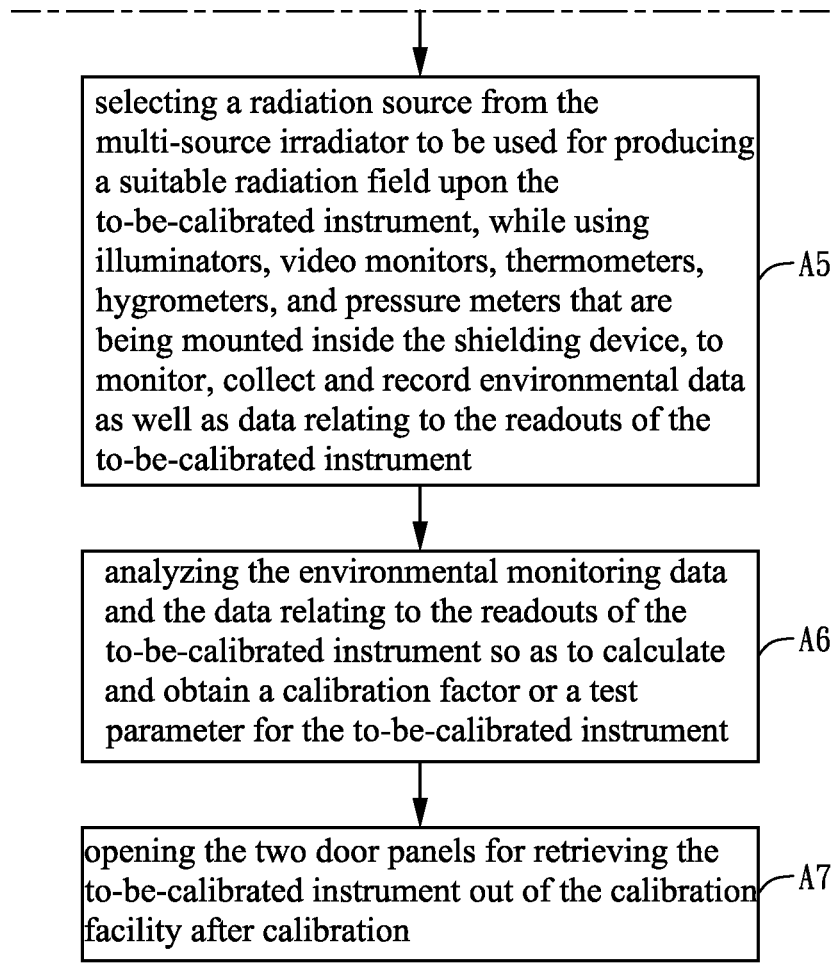

Please refer to FIG. 4, which is a flow chart depicting steps of a method for calibrating radiation measurement instruments according to the present invention. As shown in FIG. 4, the operation method for calibrating radiation measurement instruments comprises the steps of:

(A1) adjusting the carrier for leveling the shielding device and the electric door;

(A2) enabling the collimator to operate for controlling the radiation field size of the primary radiation beam to an extent that it is smaller than the inlet and the outlet so as to reduce the amount of scatter radiation generated from the interaction between the primary radiation beam and the inside of shielding device;

(A3) arranging the radiation baffle to be disposed at a position outside the outlet for reducing the amount of background radiation entering the shielding device through the outlet;

(A4) using a fixing rack of the electric door unit to position the to-be-calibrated instrument while using the control unit to remotely control a step motor of the electric door unit for enabling the two door panels to move along a rail until walling the shielding device;

(A5) selecting a radiation source from the multi-source irradiator to be used for producing a suitable radiation field upon the to-be-calibrated instrument, while using illuminators, video monitors, thermometers, hygrometers, and pressure meters that are being mounted inside the shielding device, to monitor, collect and record environmental data as well as data relating to the readouts of the to-be-calibrated instrument; and (A6) analyzing the environmental monitoring data and the data relating to the readouts of the to-be-calibrated instrument so as to calculate and obtain a calibration factor or a test parameter for the to-be-calibrated instrument;

(A7) opening the two door panels for retrieving the to-be-calibrated instrument out of the calibration facility after calibration.

Comparing with those conventional calibration apparatuses, the calibration facility of the present invention is featured by the following characteristics:

(1) By the addition of the shielding device that is formed with the inlet and the outlet for enabling the same work cooperatively with the two door panels, the interference coming from the background radiation and scattered radiation in the laboratory during the calibration can be effectively reduced.

(2) By the use of the collimator to control the radiation field size of the primary radiation beam to an extent that it is smaller than the diameters of the inlet and the outlet, the scattering coming from radiation interaction with the shielding device can be reduced, and simultaneously, by the cooperation with the radiation baffle, the and background radiation can further be reduced.

(3) By the addition of a video monitor, an illuminator and a control unit, the instrument positioning, on-site measurement and data observation/recording can be performed in a remote manner.

(4) With the design of the calibration facility of the present invention, the instrument calibration and testing can be performed in radiation fields of low-, medium- and high-dose rate levels.

With the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A radiation measurement instrument calibration facility capable of lowering scattered radiation and background radiation, adapted to be disposed inside a laboratory, the facility comprising:

a shielding device, for shielding the scattered radiation and background radiation inside the laboratory, being configured with an inlet, an outlet and a cavity in a manner that the inlet, the outlet and the cavity are arranged in communication with each other while the to-be-calibrated instrument being placed in the cavity and the cavity being in communication with two openings formed respectively on two sides of the shielding device that are perpendicular to the inlet and the outlet;

an electric door unit, for positioning the shielding device and the to-be-calibrated instrument as well as controlling the movement of two door panels for enabling the two to wall the two openings of the shielding device;

a control unit, for controlling the operation of the electric door unit in a remote manner;

a multi-source irradiator, configured with several radiation sources of different intensity, capable of emitting a primary radiation beam while allowing the radiation intensity of the same to be variable according to the radiation source that is selected from the irradiator for the emission;

a collimator, for controlling the radiation field size of the primary radiation beam while enabling the primary radiation beam to travel into the shielding device through the inlet and out of the same through the outlet;

a carrier, for carrying the shielding device and the electric door unit while adjusting the levels of the two; and a radiation baffle, for reducing the amount of background radiation entering the shielding device through the outlet.

2. The calibration facility of claim 1, wherein the cavity of the shield device further has an illuminator device configured therein.

3. The calibration facility of claim 1, wherein the cavity of the shield device further has a video monitor configured therein.

4. The calibration facility of claim 1, wherein the cavity of the shield device further has a thermometer configured therein.

5. The calibration facility of claim 1, wherein the cavity of the shield device further has a hygrometer configured therein.

6. The calibration facility of claim 1, wherein the cavity of the shield device further has a pressure meter configured therein.

7. The calibration facility of claim 1, wherein the electric door unit further comprises:

a rail, for guiding the two door panels to move along therewith; and a step motor, for power and driving the two door panels to move.

8. The calibration facility of claim 1, wherein the to-be-calibrated instrument is received inside the cavity of the shielding device, while allowing the to-be-calibrated instrument to be fixed securely by the use of the fixing rack that are mounted on the external of the to-be-calibrated instrument.

9. The calibration facility of claim 1, wherein each of the shield device, the collimator and the radiation baffle is made of a high density metal and the high density metal is a metal selected from the group consisting of: lead and stainless steel.

* * * * *